US012521312B2

(12) United States Patent
Mansour et al.

(10) Patent No.: US 12,521,312 B2
(45) Date of Patent: Jan. 13, 2026

(54) SYSTEM AND METHOD FOR COMPOUNDING MEDICATION

(71) Applicant: CareFusion 303, Inc., San Diego, CA (US)

(72) Inventors: George Mansour, Diamond Bar, CA (US); Christopher Zollinger, Chino Hills, CA (US); Jonathan Yeh, Brea, CA (US); Neil Quitoviera, Murrieta, CA (US)

(73) Assignee: CAREFUSION 303, INC., San Diego, CA (US)

(*) Notice: Subject to any disclaimer, the term of this patent is extended or adjusted under 35 U.S.C. 154(b) by 182 days.

(21) Appl. No.: 18/365,184

(22) Filed: Aug. 3, 2023

(65) Prior Publication Data

US 2023/0404853 A1 Dec. 21, 2023

Related U.S. Application Data

(63) Continuation of application No. 16/693,184, filed on Nov. 22, 2019, now abandoned, which is a (Continued)

(51) Int. Cl.

*A61J 3/00* (2006.01)
*A61J 1/20* (2006.01)
*A61J 7/00* (2006.01)

(52) U.S. Cl.

CPC ............... *A61J 3/00* (2013.01); *A61J 1/2003* (2015.05); *A61J 7/0069* (2013.01); *A61J 2200/74* (2013.01); *A61J 2205/60* (2013.01)

(58) Field of Classification Search

CPC .......... A61J 3/00; A61J 1/2003; A61J 7/0069; A61J 2200/74; A61J 2205/60

See application file for complete search history.

(56) References Cited

U.S. PATENT DOCUMENTS 4,508,148 A * 4/1985 Trechsel ............... B65B 39/145 141/147
4,718,467 A * 1/1988 Di Gianfilippo ...... G01G 17/06 141/105

(Continued)

FOREIGN PATENT DOCUMENTS

CN 1390101 A 1/2003
CN 101421172 A 4/2009

(Continued)

OTHER PUBLICATIONS

Chinese Office Action for Application No. 202011282444.0, dated Jan. 30, 2024, 11 pages including translation.

(Continued)

*Primary Examiner* — Nicolas A Arnett
(74) *Attorney, Agent, or Firm* — MASCHOFF BRENNAN

(57) ABSTRACT

A medication compounding system is described that is capable of receiving one or more medications and diluents and that includes an array of moveable transfer cartridges to access a medication container and to transfer medication. The transferred medication may be joined with a diluent to form a compounded medication. The resulting compounded medication may then be directed to a filling port where a compounded medication container may be coupled. A second medication container may align with a second transfer cartridge to transfer a second medication. Because the device may comprise one or more medications and diluents, a series of compounded medications may be created using an individual transfer cartridge for each medication.

14 Claims, 11 Drawing Sheets

Related U.S. Application Data continuation-in-part of application No. 14/319,617, filed on Jun. 30, 2014, now abandoned.

(56) References Cited

U.S. PATENT DOCUMENTS

| | | | | | |
|---|---|---|---|---|---|
| 5,085,256 | A * | 2/1992 | Kircher | A61J 3/002 141/105 |
| 5,228,485 | A * | 7/1993 | Lewis | B67D 1/108 604/254 |
| 5,313,992 | A * | 5/1994 | Grabenkort | A61J 3/002 141/105 |
| 5,555,920 | A * | 9/1996 | Godolphin | G01N 35/1079 141/285 |
| 5,626,172 | A * | 5/1997 | Schumacher | B01F 33/84 141/105 |
| 5,697,407 | A * | 12/1997 | Lasonde | A61J 3/002 141/10 |
| 5,911,252 | A * | 6/1999 | Cassel | B65B 3/003 604/407 |
| 5,927,349 | A * | 7/1999 | Martucci | A61J 3/002 73/61.61 |
| 6,309,034 | B1 * | 10/2001 | Credle, Jr. | A47F 3/08 312/305 |
| 6,793,387 | B1 * | 9/2004 | Neas | B01F 33/841 222/106 |
| 7,028,726 | B2 * | 4/2006 | Feygin | G01N 35/1083 141/144 |
| 7,171,992 | B2 * | 2/2007 | DiGianfilippo | G16H 40/63 141/105 |
| 7,343,224 | B2 * | 3/2008 | DiGianfilippo | G16H 40/63 700/265 |
| 8,286,671 | B1 * | 10/2012 | Strangis | B65B 7/28 141/144 |
| 9,327,958 | B2 * | 5/2016 | Angus | B67D 1/0041 |
| 10,555,873 | B2 * | 2/2020 | Poirier | A61J 7/0436 |
| 10,722,431 | B2 * | 7/2020 | Chen | A61J 7/0418 |
| 10,772,800 | B2 * | 9/2020 | Zollinger | B65B 3/003 |
| 10,806,673 | B2 * | 10/2020 | Zollinger | A61J 1/14 |
| 11,234,900 | B2 * | 2/2022 | Oda | A61J 3/002 |
| 2002/0035412 | A1 * | 3/2002 | Kircher | B01F 33/848 257/E21.608 |
| 2004/0149776 | A1 * | 8/2004 | Feygin | B01F 33/841 222/144 |
| 2004/0154690 | A1 * | 8/2004 | Osborne | B65B 7/2821 141/27 |
| 2004/0254525 | A1 * | 12/2004 | Uber, III | A61M 5/007 604/67 |
| 2005/0086008 | A1 * | 4/2005 | DiGianfilippo | G07F 13/06 702/19 |
| 2006/0049209 | A1 * | 3/2006 | Baker | A61J 1/2089 222/252 |
| 2008/0169045 | A1 * | 7/2008 | Tribble | B65B 59/003 141/1 |
| 2010/0147414 | A1 * | 6/2010 | Nighy | B67D 1/0022 141/10 |
| 2012/0180904 | A1 * | 7/2012 | Huitorel | B67C 3/004 141/87 |
| 2012/0241042 | A1 * | 9/2012 | Strangis | B65B 7/28 141/2 |
| 2012/0241045 | A1 * | 9/2012 | Aouad | B01F 35/1453 141/83 |
| 2012/0330152 | A1 * | 12/2012 | Reisinger | A61M 5/1413 600/431 |
| 2013/0322201 | A1 * | 12/2013 | Hitchcock | B01F 33/84 366/182.2 |
| 2014/0041748 | A1 * | 2/2014 | Angus | B67D 1/0041 141/1 |
| 2015/0374585 | A1 * | 12/2015 | Mansour | A61J 1/20 141/105 |

FOREIGN PATENT DOCUMENTS

| | | | |
|---|---|---|---|
| CN | 101559912 | A | 10/2009 |
| CN | 102481406 | A | 5/2012 |
| CN | 102574671 | A | 7/2012 |
| CN | 102639094 | A | 8/2012 |
| CN | 102740904 | A | 10/2012 |
| CN | 102791310 | A | 11/2012 |
| CN | 103429524 | A | 12/2013 |
| CN | 103582473 | A | 2/2014 |
| CN | 204840286 | U | 12/2015 |
| JP | H11193094 | A | 7/1999 |
| JP | 2007014463 | A | 1/2007 |
| JP | 2009039536 | A | 2/2009 |
| KR | 1020050037555 | A | 4/2005 |
| KR | 1020120111722 | A | 10/2012 |
| KR | 1020130096240 | A | 8/2013 |
| WO | WO-2013096911 | A1 | 6/2013 |

OTHER PUBLICATIONS

Chinese Notice of Grant for Application No. 202011282444.0, dated Dec. 11, 2024, 8 pages including machine translation.
Chinese Office Action for Application No. 202011282444.0, dated Jul. 30, 2024, 20 pages including translation.
Australian Office Action for Application No. 205284632, dated Mar. 18, 2019, 4 pages.
Brazilian Office Action for Application No. BR112016030543-4, dated Oct. 28, 2021, 5 pages including translation.
Canadian Office Action for Application No. 2953106, dated Jul. 7, 2021, 5 pages.
Canadian Office Action for Application No. 2953106, dated Mar. 1, 2022, 6 pages.
Chinese Office Action for Application No. 201510387633.7, dated Jan. 16, 2019, 11 pages.
Chinese Office Action for Application No. 201510387633.7, dated Mar. 9, 2020, 4 pages.
Chinese Office Action for Application No. 201510387633.7, dated Sep. 6, 2019, 21 pages.
European Office Action for Application No. 15732506.9, dated Apr. 15, 2020, 4 pages.
India Office Action for Application No. 201637042396, dated Sep. 8, 2020, 7 pages.
International Search Report and Written Opinion for Application No. PCT/US2015/036287, dated Dec. 4, 2015, 17 pages.
Invitation to Pay Additional Fees and Partial International Search for Application No. PCT/US2015/036287, dated Sep. 18, 2015, 5 pages.
Japanese Office Action for Application No. 2016-575750, dated Apr. 9, 2019, 13 pages.
Japanese Office Action for Application No. 2016575750, dated Dec. 10, 2019, 15 pages.
Korean Office Action for Application No. 10-2017-7001883, dated Jan. 20, 2022, 5 pages including English summary.

* cited by examiner

SYSTEM AND METHOD FOR COMPOUNDING MEDICATION

CROSS REFERENCE TO RELATED APPLICATIONS

This application is a continuation of U.S. application Ser. No. 16/693,184, entitled "SYSTEM AND METHOD FOR COMPOUNDING MEDICATION," filed on Nov. 22, 2019, which is a continuation-in-part application of U.S. application Ser. No. 14/319,617, entitled "SYSTEM AND METHOD FOR COMPOUNDING MEDICATION," filed on Jun. 30, 2014, the entireties of which are incorporated herein by their reference.

BACKGROUND

The present disclosure relates generally to the combining or processing of medication, and, in particular, relates to systems and methods for compounding medication.

The medication compounding process is often carried out by a pharmacist or medical technician who collects, measures, and combines each of the individual medications or diluents. After preparation, the pharmacist or medical technician places the compounded medication in a bag, bottle, syringe, or other compounded medication container.

Various machines may be utilized to perform compounding procedures. Manual compounders require human operation to measure and transfer a predefined volume of medication, while robotic compounders mimic the movements of a human to handle the medication containers and transferring of medication.

SUMMARY

According to certain implementations of the present disclosure, a system for compounding medication comprises a transfer module having one or more transfer cartridges, each transfer cartridge having an access device coupled to a first pump; a medication module having a plurality of medication containers, wherein the access device is configured to access at least one medication container and draw medication from the medication container; a diluent module having one or more diluent containers having a diluent therein, the diluent module comprising a second pump; a filling module that receives medication from the first pump and diluent from the second pump to create a compounded medication comprising at least one medication and diluent, the filling module having a port configured (i) to be coupled to a compounded medication container and (ii) to direct the compounded medication to the compounded medication container through the port. The method further comprises a transfer module having removable transfer cartridges, wherein at least one of the transfer module or medication module is configured to rotate.

In some implementations of the present disclosure, systems for forming a plurality of compounded medications include an array of access devices, each access device having a medication receiving portion; an array of medication containers, each having a fluid port configured to receive the medication receiving portion of an access device to fluidly couple the medication container with the access device, such that medication is drawn from the medication container through the medication receiving portion, wherein at least one of the array of access devices or the array of medication containers is configured to move to align the medication receiving portion with at least one medication container; and an outlet port, configured to fluidly couple with the access device to receive medication, from at least one medication container, and to communicate the medication to a compounded medication container.

In some implementations of the present disclosure, systems for forming a plurality of compounded medications include directing a diluent into a medication container to reconstitute a non-aqueous medication. In some embodiments, reconstitution of the medication can occur within a medication container that originally houses the non-aqueous medication when provided to the system.

Some methods for compounding medications include receiving at least one order for a compounded medication; receiving at least one medication container; receiving at least one diluent container; fluidly coupling a transfer cartridge with a medication container; withdrawing a medication from at least one medication container; withdrawing a diluent from at least one diluent container; receiving a medication and diluent at a port; communicating a medication from the port to a compounded medication container. Some methods further include the step of fluidly coupling a second transfer cartridge with a second compounded medication container.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

A phrase such as “an aspect” does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as “an aspect” may refer to one or more aspects and vice versa. A phrase such as “an embodiment” does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such “an embodiment” may refer to one or more embodiments and vice versa. A phrase such as “a configuration” does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as “a configuration” may refer to one or more configurations and vice versa.

Medication compounding systems disclosed herein include a compounding device capable of receiving one or more medications and diluents. One or more transfer cartridges can be used to access and transfer medication and diluents. In a compounding procedure, transferred medication may be joined with a diluent to form a compounded medication. The resulting compounded medication may then be directed to a filling port where a compounded medication container may be coupled. The system comprises one or more medications, diluents, and transfer cartridges to create a series of compounded medications using an individual transfer cartridge for each medication or for each patient.

Figure 1:
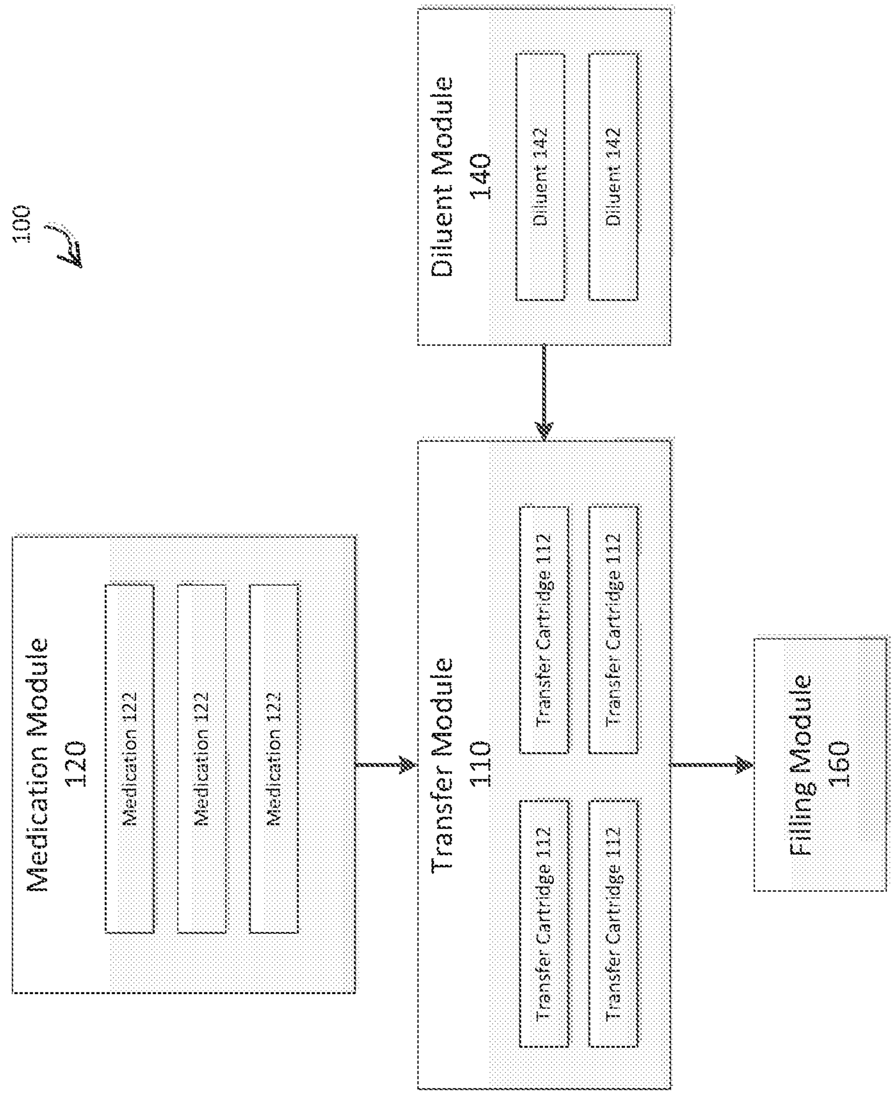
FIG. 1 illustrates an exemplary schematic diagram of a medication compounding system.

Referring to FIG. 1, a schematic diagram of a medication compounding system 100 capable of performing one or more medication compounding procedures is illustrated. The medication compounding system 100 may include a transfer module 110, a medication module 120, a diluent module 140, and a filling module 160 in fluid communication.

The transfer module 110 is configured to access and transfer medication 122 and diluent 142 to a filling module 160. The transfer module 110 may comprise one or more transfer cartridges 112 configured to access, withdraw, and transfer a medication 122 from a medication container. The transfer module 110 may comprise an individual transfer cartridge 112 for each compounding procedure or an array of transfer cartridges 112. The array of transfer cartridges 112 may be disposed on one or more moveable chassis. One transfer cartridge 112 may be used for each medication, whereby medication 122 may be accessed, withdrawn, and transferred without the risk of cross-contamination with other medications 122 or between compounded medications. To facilitate replacement of the transfer cartridges 112, individual transfer cartridges may be removed and replaced, or the entire array of transfer cartridges 112 may be removed and replaced.

In some embodiments, the chassis may move to align an individual transfer cartridge 112 with a medication container. The transfer cartridges 112 may then be fluidly coupled to the medication container by an access device such as a needle or other fluid fitting.

To withdraw medication 122, one or more first pumps may be coupled to the transfer cartridges 112. In some embodiments, an array of first pumps may be moved jointly with the transfer cartridge chassis. A new pump may be used for each medication 122, or a single pump may be used for each medication compounding procedure. The first pump may be of a low-flow type, providing accurate transfer of the medication 122 from the medication module 120.

The medication module 120 is configured to retain one or more medications 122 to be used in a medication compounding procedure. The medication module 120 may work in conjunction with the transfer module 110 to allow a transfer cartridge 112 to access and withdraw medication 122. The medication module 120 may be configured to receive one or more medication containers. The medication containers may be disposed upon a moveable medication tray which may be, for example, a chassis or carrousel. The medication tray may be removable to facilitate acquisition and placement of the medication containers in the medication module 120. When installed in the medication module 120, the medication tray may align a medication container with a transfer cartridge 112, whereby the medication 122 may then be accessed by the transfer cartridge 112.

The diluent module 140 is configured to retain and direct one or more diluents for use in a compounding procedure. The diluent 142 may be utilized as a component of the compounded medication, to reconstitute a medication 122, or to prime a compounded medication container, such as an intravenous bag and line. The diluent module 140 may comprise one or more diluent containers and a second pump. The second pump may be a high-flow type pump, capable of transferring diluent 142 at a high velocity or in large volume. In some embodiments, the second pump may be easily replaceable, for example, with each compounding procedure or with the replacement of each diluent 142 in the diluent module 140.

The filling module 160 is configured to receive and communicate a compounded medication into a compounded medication container. The medication 122 and diluent 142 are communicated to the filling module 160 where they are then transferred through a filling port to a compounded medication container. The filling port may be configured to allow a variety of compounded medication containers 900 (FIG. 5) to be fluidly coupled. For example, an intravenous bag or a syringe may be coupled to the filling port.

During the compounding procedure, the contents of the compounded medication container may be confirmed. For example, the compounded medication container may rest upon a scale or other sensor when coupled with the filling module 160.

Figure 2:
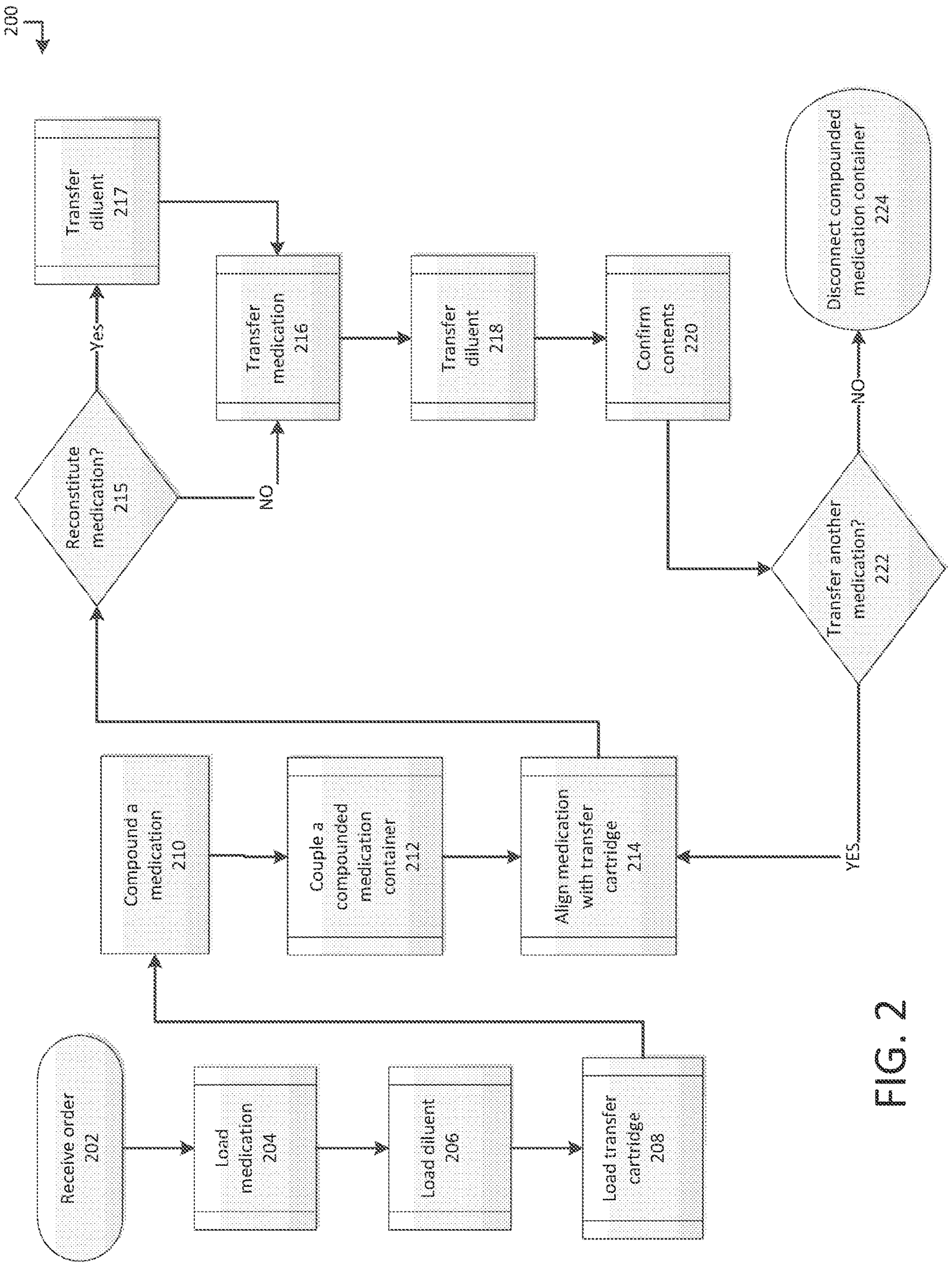
FIG. 2 illustrates an exemplary flowchart of a medication compounding system.

Referring to FIG. 2, a flowchart illustrates methods of a system process 200 for compounding medication. In operation, the medication compounding system process 200, in step 202, receives an order to create one or more compounded medications. The order may be entered utilizing a user interface or received by the system process 200 through a network. In some embodiments, the system process 200 may evaluate each compounded medication order and determine what medication or diluent is required to fulfill each order. In step 204, medication containers containing the medication to be compounded are loaded in the medication tray of the medication module.

When loading the medication containers, the user may input data for each medication being loaded into the medication module. The data may include information such as medication type, expiration date, concentration, volume, or location of the medication container in the medication tray. In some embodiments, the medication compounding system process 200 includes an identifying feature such as a barcode scanner to identify each medication. In a further embodiment, the medication compounding system process 200 may use one or more sensors, such as an RFID sensor, to detect which medication is loaded in the medication module and to identify the particular location of each medication container in the medication tray.

At step 206, one or more diluents, such as saline, sterile water, or dextrose, may be coupled to the system at the diluent module. The diluents may be of a size and configuration to be replaced with less frequency than the medication containers. Next, in step 208, the transfer cartridges are individually loaded into the transfer module or a chassis having an array of transfer cartridges and first pumps may be loaded.

Once the required medication, diluent, and transfer cartridges are provided, the next step 210 initiates the combining of the constituents to compound the medication. In step 212, the medication compounding system process 200 may prompt the user to couple a specified compounded medication container to the filling port of the filling module. The compounded medication container may be of the type typically used to contain a compounded medication, such as an intravenous bag, or a syringe. Once the compounded medication container is coupled to the filling port, in some embodiments, the medication compounding system process 200 may require the user to confirm the coupling of the compounded medication container, or the system may itself identify coupling of the compounded medication container. Because a container having a sufficient interior volume should be used, the user may be requested to enter or confirm the compounded medication container size using the user interface, or the system process 200 may utilize an identifying feature or sensor to confirm that the required container size is coupled.

To create a compounded medication, in step 214, the medication compounding system process 200 aligns the desired medication container with a transfer cartridge so that a fluid port in the medication container may be fluidly coupled with the transfer cartridge. The fluid coupling may be achieved, for example, by using a needle that extends into a fluid port in the medication container or another connection, such as needleless access valve. The system process 200 determines whether it is desirable to reconstitute the medication prior to withdrawal in step 215. If so, diluent may be directed into the medication container in step 217 to reconstitute the medication. The medication is then withdrawn from the medication container and, in step 216, is transferred to the filling module. Once the desired medication has been transferred, the access device and medication container may be decoupled.

In instances where the medication is not aqueous, or where otherwise desired, the system may direct a diluent into the medication container in step 218 to facilitate subsequent withdrawal of the medication. In instances where the medication must be agitated prior to withdrawal, the system process 200 may move or rotate the medication module to agitate the contents of a medications container. In instances where a diluent is desired, such as for intravenous delivery, the system process 200 directs a specified diluent from the diluent module to the filling module. In instances where it is desired to prime the compounded medication container, some methods provide that the system process 200 first transfers the compounded medication to the container and then transfers a diluent to the container.

During the compounding procedure, the medication compounding system process 200 may confirm the contents of a medication container, a diluent container, or a compounded medication container, for example in step 220. The contents may be confirmed, for example, by assessing weight or by visually confirming it is filled. In some embodiments, the system may determine whether an additional medication is to be transferred during the compounding procedure in step 222. If so, the system process 200 may transfer an additional medication by returning to step 214 where another medication may be aligned with the transfer cartridge to continue the medication compounding procedure. In some embodiments, the system process 200 aligns another medication and a new transfer cartridge together before continuing the medication compounding procedure. Alignment of the medication with the transfer cartridge may be accomplished by (i) rotating at least one or both of the medications (e.g., the medication module or a portion of the medication module) and the transfer cartridge, (ii) linear translation of one or both of the medications and the transfer cartridge relative to each other, (iii) a combination of rotation and linear movement of one or both of the medications and the transfer cartridge, or (iv) some other movement or combination of relative movements. In some embodiments, the system process 200 may identify the location of each transfer cartridge and pump and designate a specific transfer cartridge for use with a particular medication or patient.

Once the medication compounding system process 200 has completed the particular compounding procedure, the user may then disconnect the compounded medication container from the filling port in step 224. In some embodiments, the system process 200 is coupled to a printer that may produce a label comprising compounded medication data. In some embodiments, the system process 200 may attribute an identifier, such as RFID data, to the compounded medication container. Finally, the system process 200 may prompt the user to couple another compounded medication container to the filling port and repeat the compounding procedure.

Still referring to FIG. 2, the system process 200 may include and utilize a processor, a data storage device, and memory. The system process 200 may be configured to provide or facilitate communication with a database to receive or transmit instructions that include one or more orders for a compounded medication in step 202. In some embodiments, the system process 200 may include receiving or transmitting instructions via the user interface. For example, a user may enter or receive a series of compounded medication orders through the user interface. The database may be local or over a network and may include medication data such as formula, expiration date, or concentration. The database may also include data on medication compounding procedures. In some methods, a user may be instructed to couple one or more medications, diluents, or a compounded medication container. In steps 204, 206, 208, and 212, the system process 200 may include identifying each item coupled and its position in the system, or receive such information through the user interface.

In step 212, the system process 200 may compound a medication by instructing the alignment of a medication container and a transfer cartridge. As will be described with reference to FIGS. 3 and 4, once aligned, the medication module and transfer module may be directed toward each other to couple the medication container and transfer cartridge. In steps 216 and 218, medication or diluent is directed to the compounded medication container. In step 220, the system process 200 may confirm the contents of a medication container, a diluent container, or a compounded medication container. In step 222, the system may direct an additional medication or diluent to be transferred, or, in step 224, to disconnect the compounded medication container.

Figure 3A:
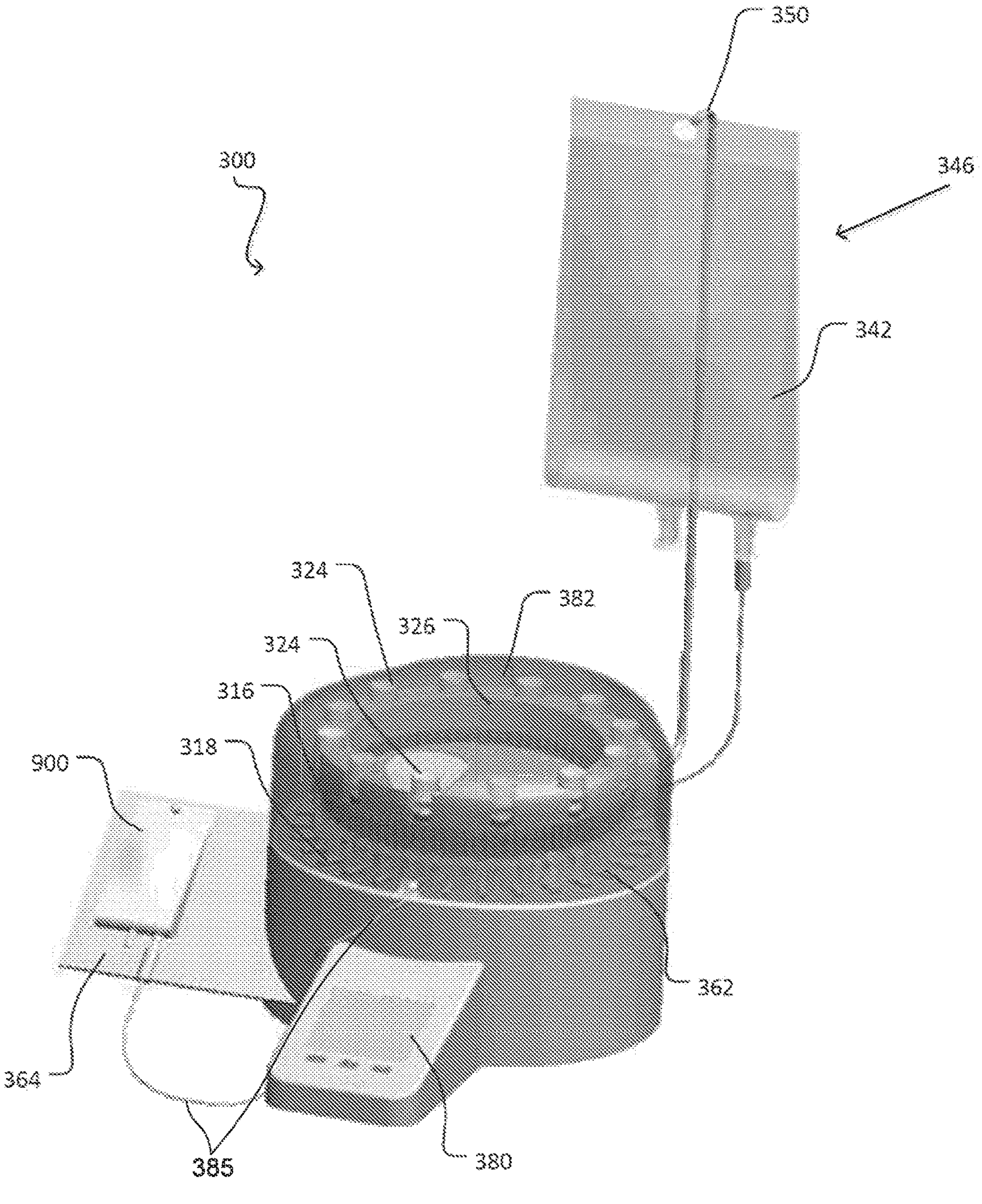
FIG. 3A illustrates a front perspective view of embodiments of a medication compounding system.
Figure 3B:
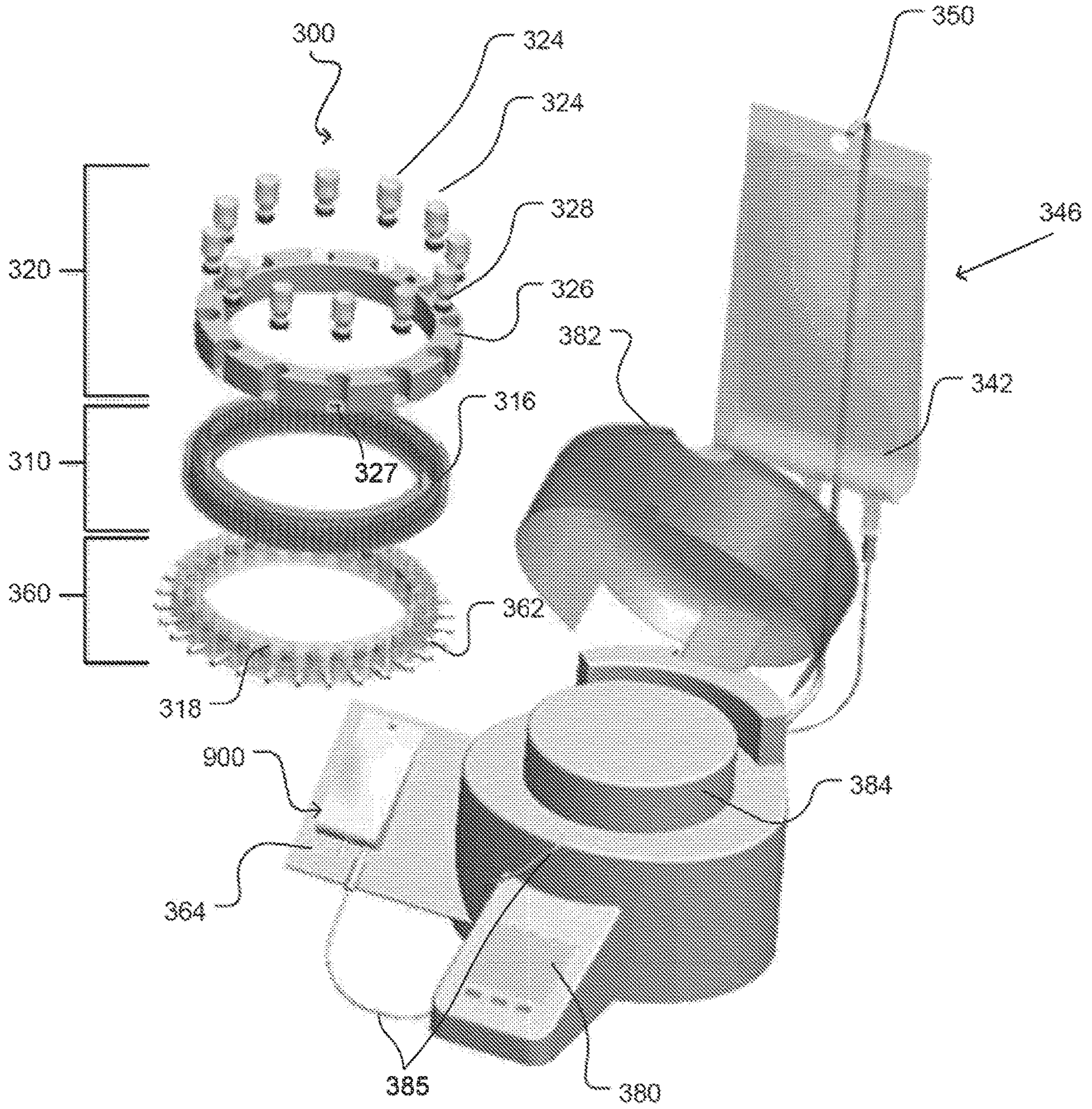
FIG. 3B illustrates an exploded view of the medication compounding system of FIG. 3A.

Referring to FIGS. 3A-3D, exemplary embodiments of the medication compounding system 300 are illustrated. In these embodiments, an order may be received or entered using a user interface 380. The medication module 320, transfer module 310, and filling module 360 each rotate about a common axis. Preferably, each module is configured as a removable circular array enclosed by a lid 382. Referring to FIG. 3B, the medication module 320 may include a medication tray 326 configured to retain an array of medication containers 324, the transfer module 310 may include a chassis 316 configured to retain an array of transfer cartridges, and the filling module 360 may be configured to retain an array of first pumps 318 and/or filling ports 362. As readily apparent in view of the disclosure herein, system 300 may include one or more motors and a processor (e.g., located in the base of system 300, below hub 384), and each motor may be operable to drive one or more gears to rotate one or more respective module about the common axis, either individually or as a group. In this regard, the processor may direct a respective motor to rotate the module to align a respective medication container 324, a respective transfer cartridge, and a respective pump 318. As readily apparent in view of the disclosure herein, each pump may be a reciprocating or peristatic pump or any other pump readily available to one skilled in the art, and the filling module 360 and/or pumps 318 may be controlled by a processor, which may activate each pump individually or as a group.

The modules may be loaded into the system 300 by upwardly rotating the lid 382. The filling module 360 may then be placed onto a hub 384 followed by the transfer module 310 and medication module 320. A medication container 324 may be inserted into the medication tray 326 before or after coupling the medication module 320 with the system 300. A diluent 342 may be coupled with the system 300 by suspending a diluent container 346 from the hanger 350. A compounded medication container 900 may be coupled to the filling port 362 and placed upon the sensor 364.

Figure 3C:
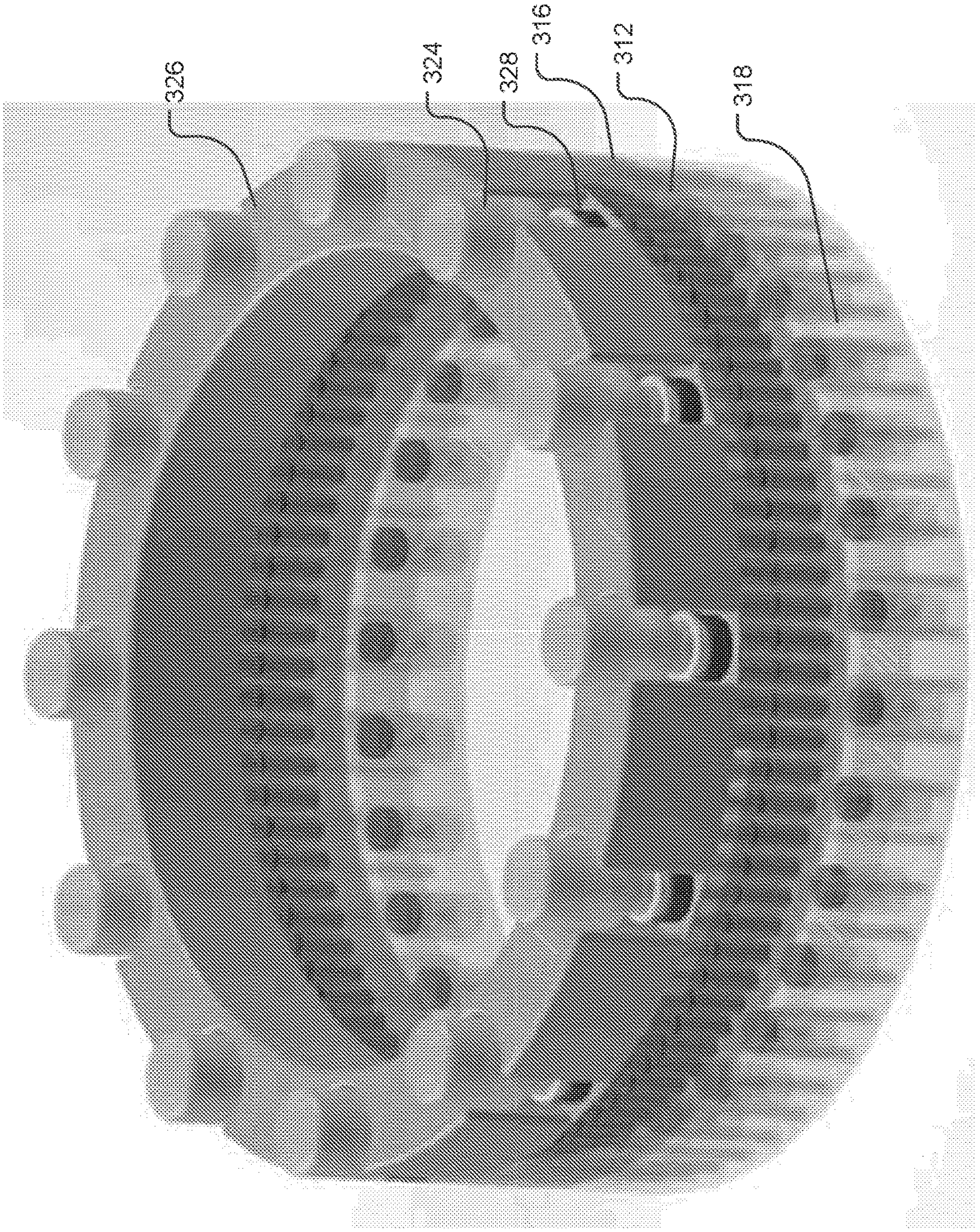
FIG. 3C illustrates a sectional view of the medication compounding system of FIG. 3A.

As best illustrated in FIG. 3C, each array may be configured such that a medication container 324, transfer cartridge 312, and first pump 318 may align circumferentially, or about a tangential axis parallel to the axis of rotation. When a medication container 324, transfer cartridge 312, and first pump 318 are aligned, the filling port 362 extends, for example, laterally or distally, from the filling module 360 so it can be fluidly connected to a fluid line 385 that is connected to the medication container 900.

Figure 3D:
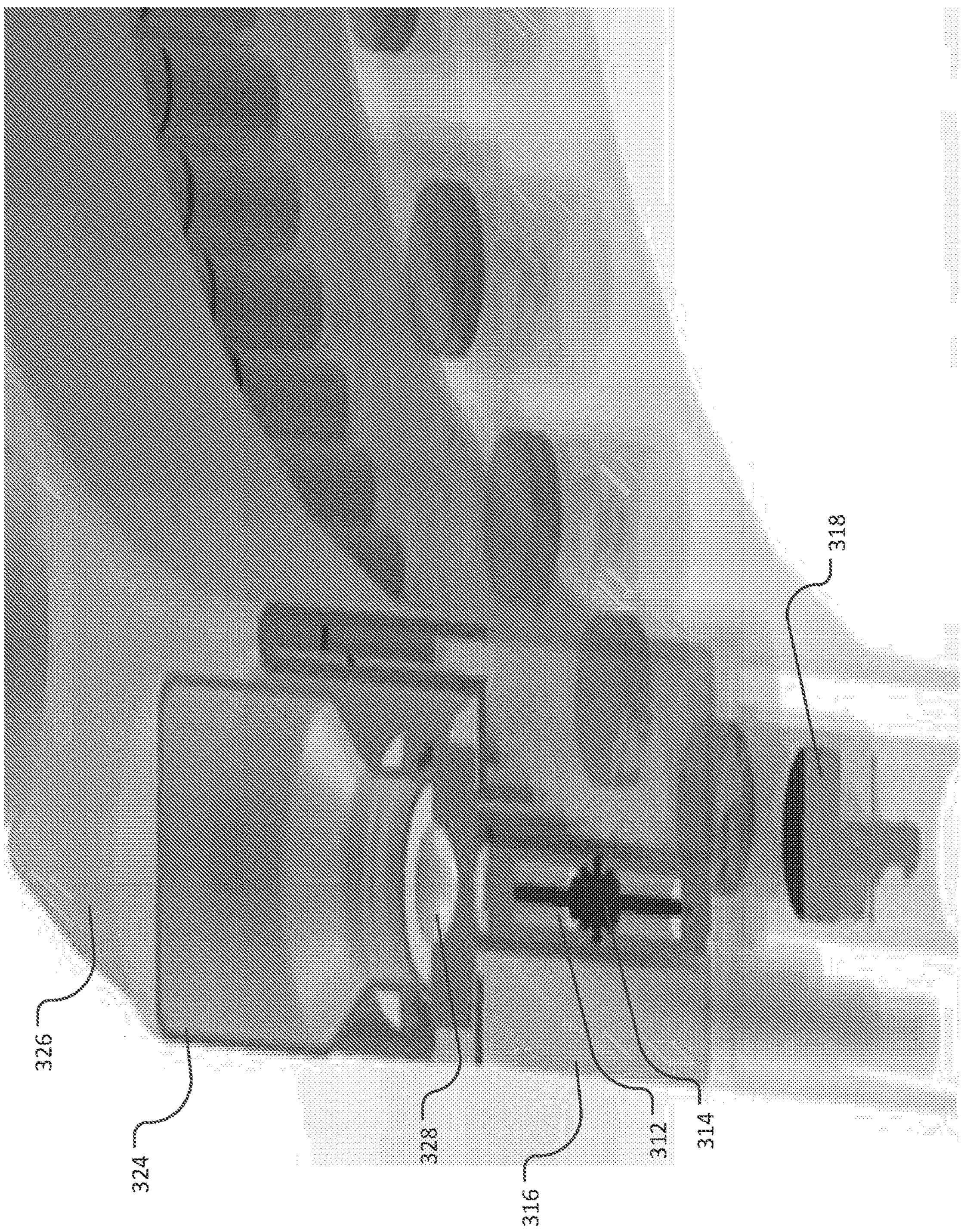
FIG. 3D illustrates a sectional view of the medication compounding system of FIG. 3C.

Referring to FIG. 3D, an array of transfer cartridges 312 are disposed between the medication module 326 and an array of first pumps 318. As depicted in FIG. 3D, the medication tray 326 is positioned sufficiently above access devices 312 such that the access devices 312 do not engage medication containers 324 held by the medication tray 326. A medication container 324 may be fluidly coupled to a first pump 318 by engaging an access device 314 of the transfer cartridge 312 with a fluid port of the medication container 324. In some embodiments, the fluid coupling is achieved by lowering a medication container 324 from the medication tray 326 onto the transfer cartridge 312 such that a proximal portion of the access device 314, proximate the medication container 324, extends into a fluid port 328 of the medication container 324. As depicted in FIG. 3B, the medication tray includes respective access ports 327 at a base of each location of a respective medication container. Ports 327 enable an access device 314 to extend through the port 327 and into a fluid port of the corresponding medication container 324. As readily apparent to one skilled in the art, medication tray may be connected to a motor (e.g., within the body and controlled by the processor), which may lower the tray, which lowers the medication containers 324 held by the tray. When the medication tray 326 is lowered, respective access devices 314 under the tray extend through respective ports 327 and into respective medication containers 324.

Similar to medication tray 326, and as depicted in FIG. 3D, transfer module 316 is positioned sufficiently above pumps 318 such that the access devices 314 facing pumps 318 do not engage with the respective ports of the pumps 318. Together, the medication container(s) 324 and access device(s) 314 may be further lowered by a motor such that the portion of the access device 314 extending distally, or away from the medication container 324, and may extend into a first pump 318. As is readily apparent from FIG. 3D, each corresponding access device pair 312, 314 form a fluidic passage, and when a respective access device 312 is engaged with a medication container 324, and the corresponding access device 314 is engaged with a respective pump 318, a fluidic connection is formed between the pump and the medication container 324. Each pump is positioned between a respective access device 314 and a respective filling port 362. As depicted in FIG. 3B, a bottom portion of a respective pump 318 is in fluidic communication with a respective filling port 362. A fluidic channel is formed between the medication container 324, through the fluidic channel of the respective access devices, through the pump, and the respective filling port 326. As is readily apparent in view of the disclosure herein, when the pump is activated (e.g., by a processor), a suction is created, moving a fluid (e.g., a medication) stored in a respective medication container 324 to the respective filling port 326.

In some embodiments, a first access device 314 may extend into the medication container 324, while a second access device (not shown) may extend into the first pump 318. In some embodiments, the medication module 320 and transfer module 310 may rotate independently about the common axis before moving translationally along the rotational axis to engaging each other and become fluidly coupled. The user interface 380 facilitates operation of the medication compounding system 300 by a user. For example, the user interface can include a touch screen that allows the user to enter information or instructions and receive updates and information relating to the compounder system or the process.

Figure 4A:
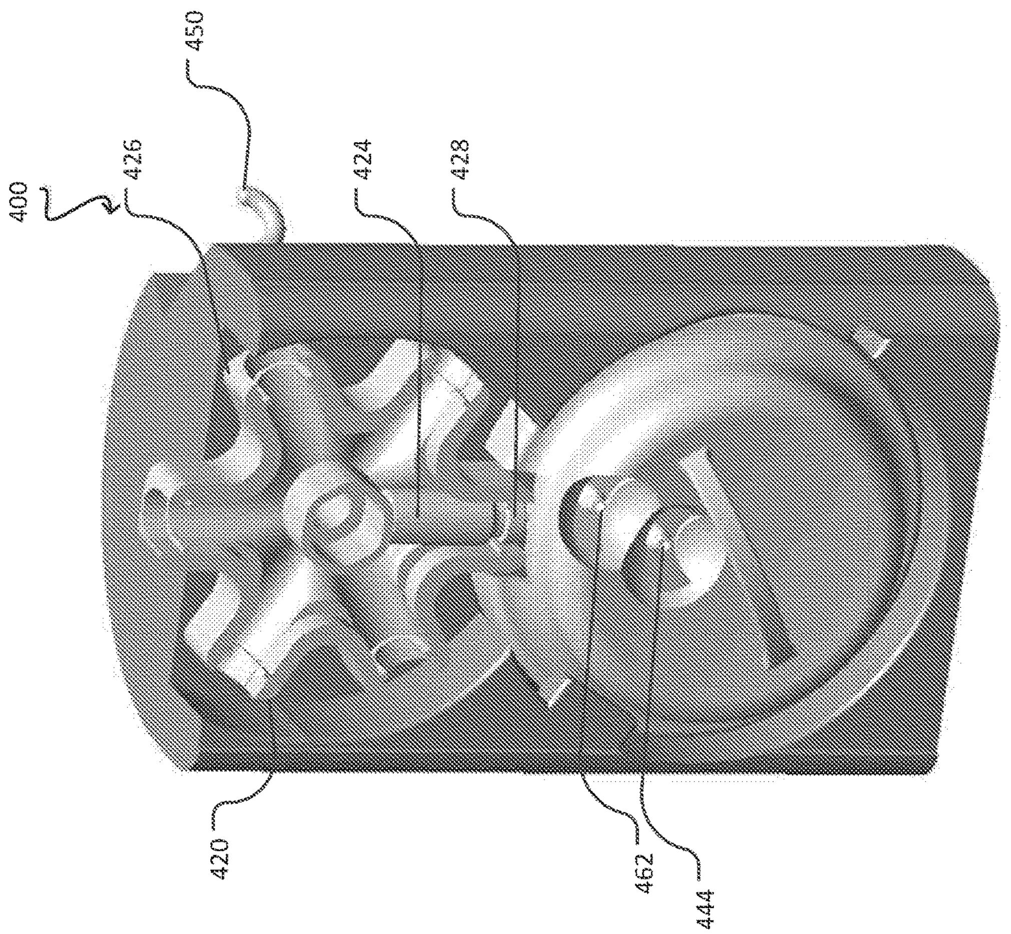
FIG. 4A illustrates a front perspective view of embodiments of a medication compounding system.
Figure 4B:
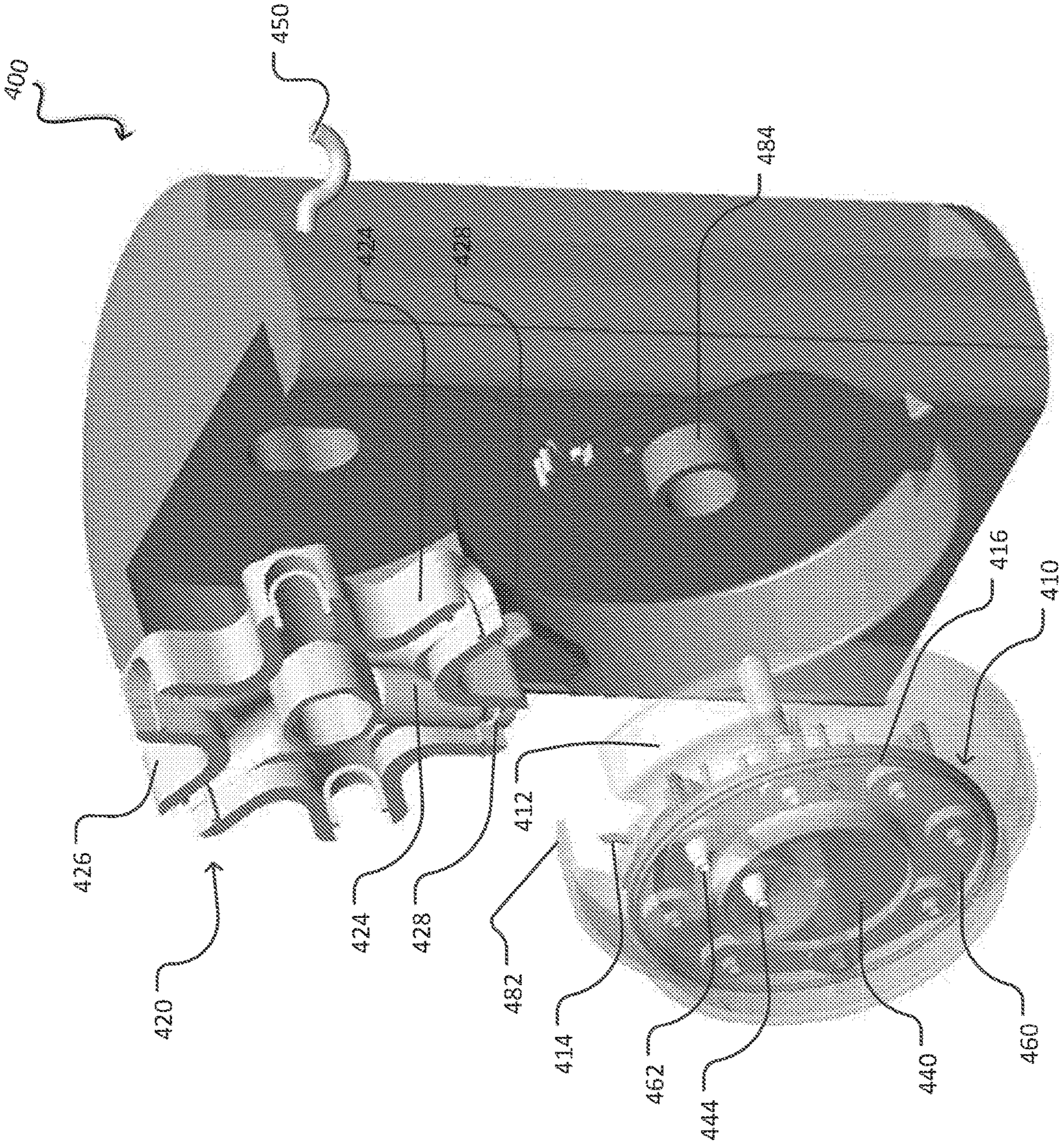
FIG. 4B illustrates an exploded sectional view of the medication compounding system of FIG. 4A.
Figure 4C:
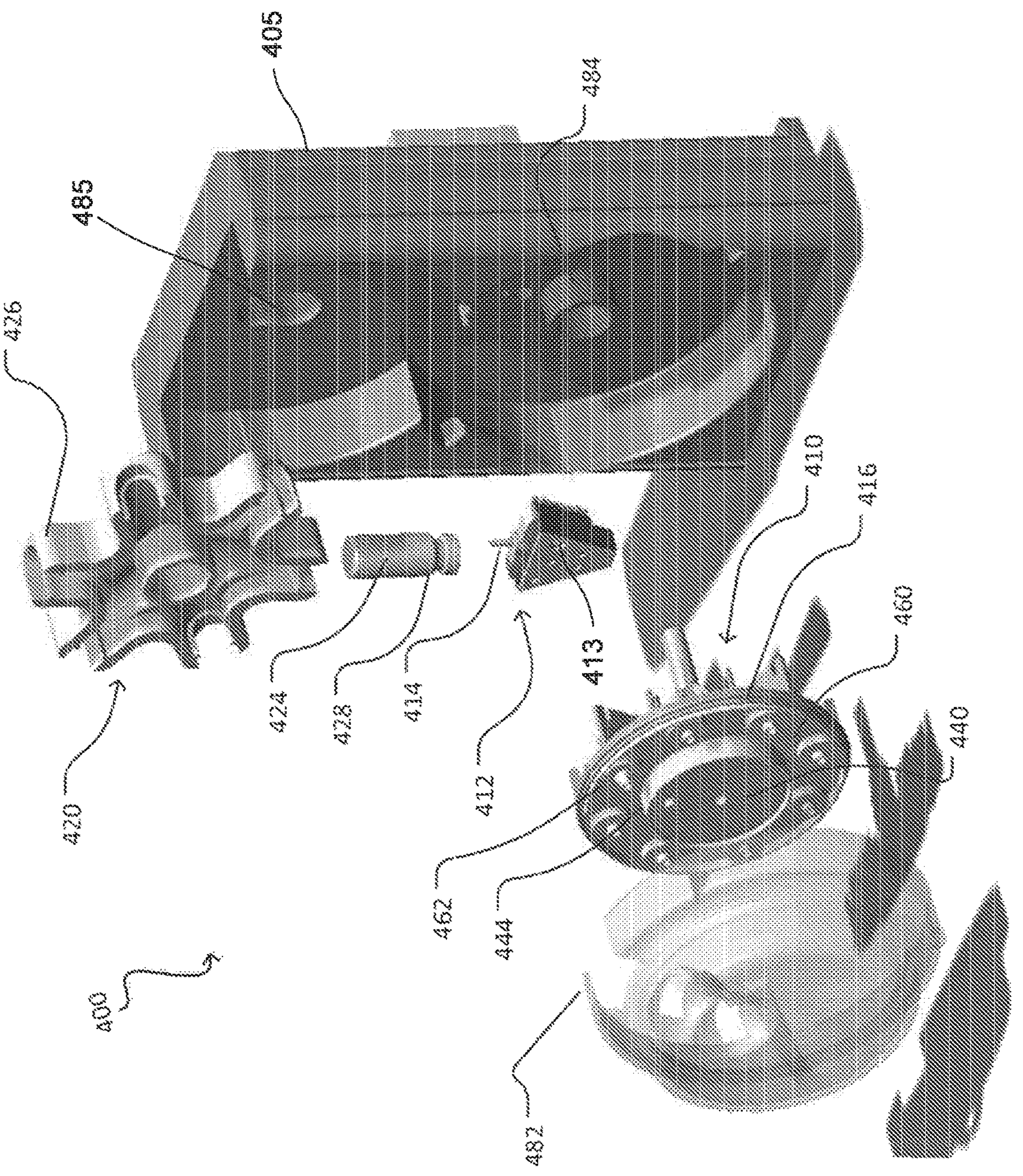
FIG. 4C illustrates an exploded view of the medication compounding system of FIG. 4B.

Referring to FIGS. 4A-C, embodiments of the medication compounding system 400 are illustrated having a medication module 420 and a transfer module 410 that are coupled to a body portion 405 of the medication compounding system 400, and rotate about two axes. In these embodiments, the transfer module 410, a diluent module 440, and a filling module 460 rotate about a common axis that is substantially parallel to and offset from the axis about which the medication module rotates. A circular array of transfer cartridges 412 is disposed around the common axis.

A filling port 462 is disposed on a circular ring that is parallel to the array of transfer cartridges 412. A diluent port 444 is disposed on the diluent module 410 and proximate to the axis of rotation on the same plane as the filling port 462 ring. In some implementations, the transfer module 410, diluent module 440, and filling module 460 may each rotate independently of each other.

Referring to FIGS. 4B and 4C, the modules may be loaded into the system 400 by first coupling a transfer cartridge 412 to the chassis 416 of the transfer module 410 (as shown in FIG. 4B). The filling module 460 and diluent module 440 may then be joined with the transfer module 410 as an assembly. The joining of the filling module 460 and diluent module 440 may form a rotating union or rotary joint between the two modules. The assembly may then be loaded by removing the lid 482 and coupling the assembly onto a hub 484. As depicted in FIG. 4C, the assembly (e.g., transfer module 410 or chassis 416) includes a drive shaft that rotatably connects the assembly with the body by extending through a socket of the hub 484. A diluent (not shown) suspended from the hanger 450 and coupled with the diluent port 444. A compounded medication container (not shown) may be coupled to the filling port 462.

To compound a medication, the transfer module 410 may rotate to align and couple a transfer cartridge 412 with a medication container 424. In some embodiments, the transfer cartridge 412 is coupled with a medication container 424 by lowering the medication tray 426 so that an access device 414 may extend into a fluid port 428 of the medication container 424. As depicted in FIG. 4C, the medication module 420 (including medication tray 426) is rotatably connected with the body by way of a second hub 485. Similar to transfer module 410 and/or chassis 416, medication module 420 also includes a drive shaft (not shown) that rotatably connects the medication module 420 with the body 405 by extending through a socket of the hub 485. As depicted in FIG. 4C, hub 484 may include an elongated slot disposed within the body 405, with the elongated slot configured to permit up and down movement of the medication module and the medication tray, towards or away from the transfer module 410. The up and down movement may be achieved by movement of the drive shaft (not shown) in a vertical direction by any manual or motorized mechanism readily available to those skilled in the art. The transfer cartridge 412 and medication container 424 may also be coupled by raising the transfer module 410, diluent module 440, and filling module 460. The transfer cartridge 412 and medication container 424 may also be coupled by extending a retractable access device 414 into a fluid port of the medication container 424.

After the transfer cartridge 412 and medication container 424 are coupled, medication 422 may be withdrawn from the medication container 424 and directed to the filling port 462. As depicted in FIG. 4C, transfer cartridge 412 includes a port 413 on a side of the transfer cartridge facing transfer module 410, and which is positioned to engage an opening of filling port 462 that faces transfer cartridge 412 and create a fluidic connection between transfer cartridge 412 and filling port 462. The fluidic connection between filling port 462 and port 413 may be sealed by a gasket or any sealing mechanism readily available to those skilled in the art. Additionally, diluent may be transferred from the diluent port 444 to the filling port 462 (e.g., by way of the rotating union or rotary joint formed between filling module 460 and diluent module 440, or other internal fluidic connection readily available to those skilled in the art). After completing the transfer of a first medication (not shown), the medication tray 426 may rise, or extend away from the transfer cartridge 412, to disengage the medication container 424 from the transfer cartridge 412 and then rotate to align a second medication container 424. The transfer module 410 may also rotate to align a new transfer cartridge 412. In some embodiments, the diluent module 440 disengages from the diluent port 444 before movement of the transfer module 410. The medication tray 426 may then lower to once again couple the transfer cartridge 412 and medication container 424. The embodiments of FIGS. 4A-4C facilitate removal or replacement of an individual medication container 424 without removal of the medication tray 426.

Figure 5:
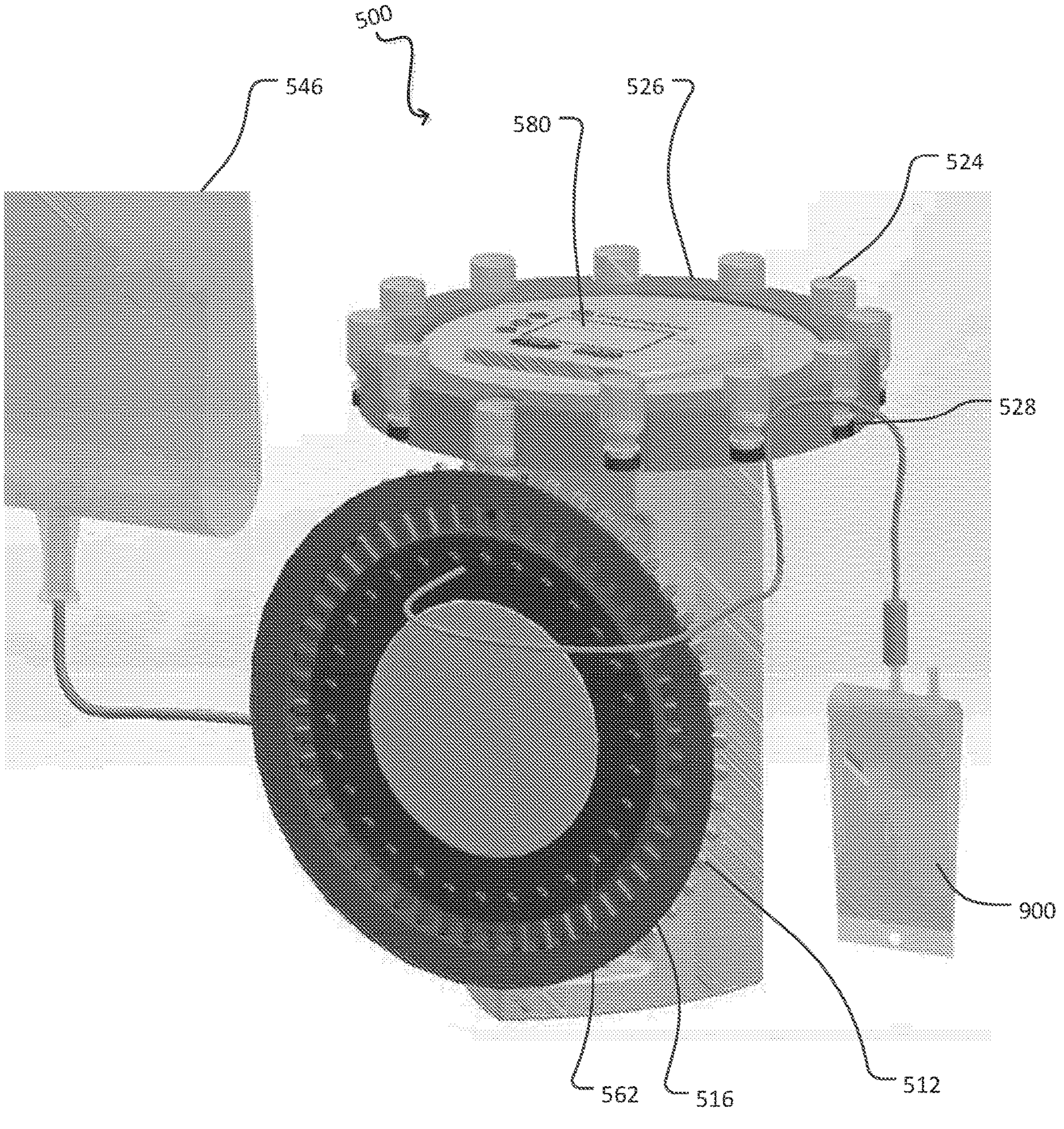
FIG. 5 illustrates a front perspective view of embodiments of a medication compounding system.

Referring to FIG. 5, embodiments of the medication compounding system 500 are illustrated having a medication module and a transfer module that rotate about substantially perpendicular or transverse axes. The medication module and a user interface 580 are disposed on a horizontal plane that is parallel to the transfer module rotational axis. The medication module may include a medication tray 526 configured to retain an array of medication containers 524.

In these embodiments, an array of transfer cartridges 512 and first pumps (not shown) are configured as concentric arrays that rotate about a common axis. An outer array, comprising transfer cartridges 512 retained by a chassis 516, surround an inner array of first pumps. The inner array may further comprise filling ports 562 whereby a compounded medication container 900 may be coupled. The outer array of transfer cartridges 512 or inner array of first pumps may be removed or replaced without removal of the other. A diluent container 546 may be coupled to the medication compounding system 500 such that the diluent (not shown) is fluidly coupled to the filling port 562.

To compound a medication, the transfer module may rotate to align and couple a transfer cartridge 512 with a medication container 524. In some embodiments, a medication container 524 is fluidly coupled by aligning with a transfer cartridge 512 and lowering from the medication tray 526 onto an access device (not shown) of a transfer cartridge 512 such that the access device enters a fluid port 528 of the medication container 524. Once the medication is withdrawn and transferred through the filling port 562 to the compounded medication container 900, the medication container 524 may return to the medication tray 526. The compounding procedure may continue by transferring diluent to the compounded medication container 900. The system 500 may transfer an additional medication by rotating the medication tray 526 and/or transfer module to align a second transfer cartridge 512 and/or medication container 524.

Figure 6:
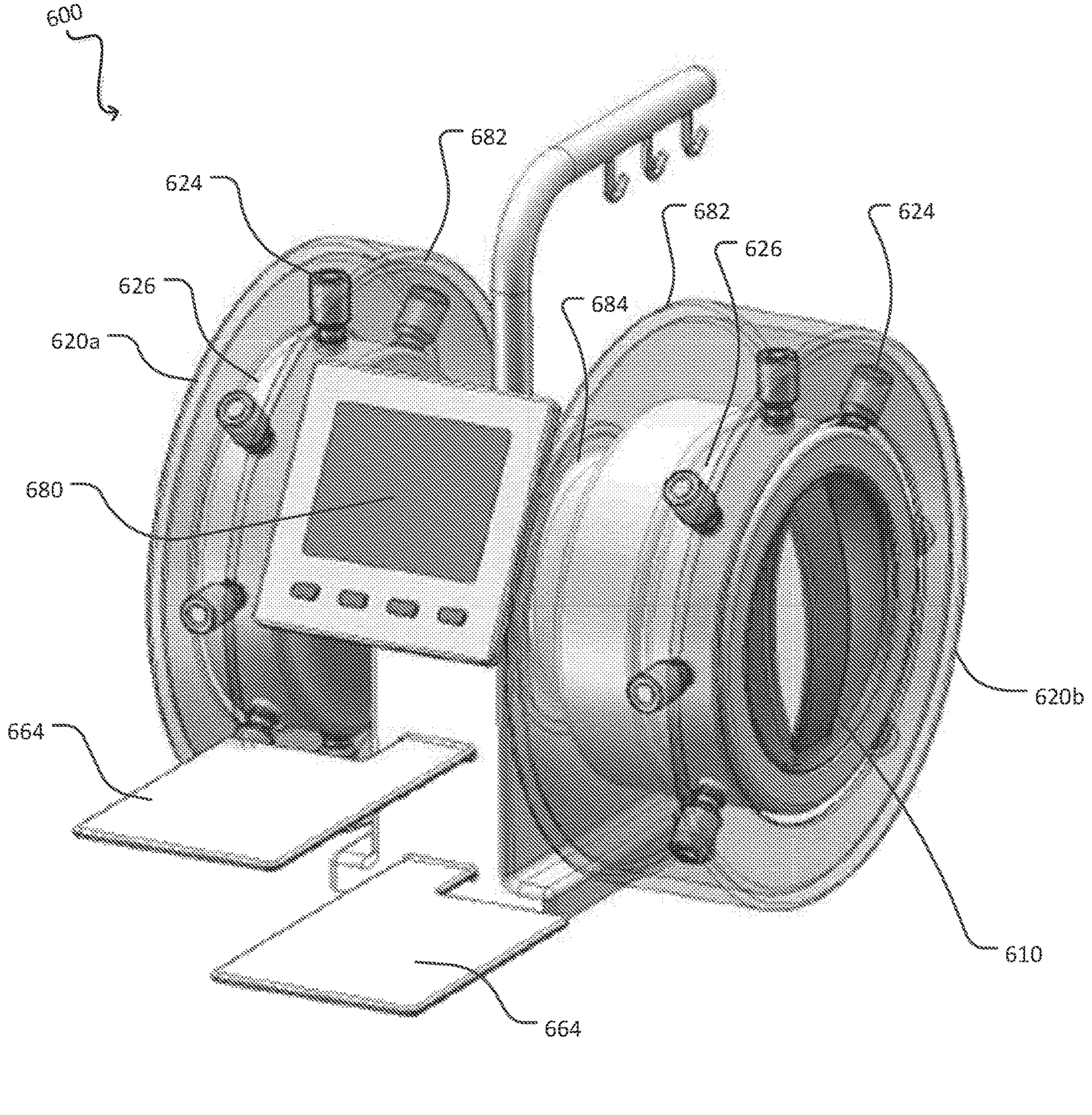
FIG. 6 illustrates a front perspective view of embodiments of a medication compounding system.

Referring to FIG. 6, embodiments are illustrated having a first and second medication module 620*a*, 620*b* that rotate on opposing sides of the medication compounding system 600. A user interface 680, diluent hanger 650, and surfaces having a sensor 664 may be disposed between the first and second medication module 620*a*, 620*b*. In some embodiments, the diluent hanger 650 is coupled with a sensor (not shown). Each medication module 620*a*, 620*b* may include a medication tray 626 configured to retain an array of medication containers 624. The medication containers 624 may be inserted into the medication tray 626 prior to installing each medication module 620*a*, 620*b* onto the hub 684. In some embodiments, a medication container may be inserted into the medication tray 626 by removing the lid 682. A transfer module 610 having an array of transfer cartridges 612 may be inserted into the center of each cylindrical medication module 620*a*, Ob.

To compound a medication, a medication module 620*a* or 620*b* and a transfer module 610 may rotate to align and couple a transfer cartridge (not shown) with a medication container 624. The first medication module 620*a* may be utilized for medication in a liquid state, while the second medication module 620*b* may be utilized for medication requiring reconstitution. Medication in the second medication module 620*b* may be reconstituted by directing a diluent (not shown) into a medication container 624. The medication module 620*b* may then rotate to agitate and reconstitute the medication 622. The diluent may be directed into the medication container 624 by adjusting valves within the medication compounding system 600 and/or reversing operation of the first pump (not shown). The compounding procedure may continue by transferring medication and/or diluent to the compounded medication container (not shown) coupled to the system 600. The system 600 may transfer an additional medication by rotating a medication module 620*a*, 620*b* and/or transfer module 610 to align a second transfer cartridge (not shown) and/or medication container 624. During the compounding procedure, the system 600 may confirm the contents of the compounded medication container by assessing weight using the sensor 664.

The term "machine-readable storage medium" or "computer readable medium" as used herein refers to any medium or media that participates in providing instructions to the processor for execution. Such a medium may take many forms, including, but not limited to, non-volatile media, volatile media, and transmission media. Non-volatile media include, for example, optical or magnetic disks, such as the data storage device. Volatile media include dynamic memory, such as the memory. Transmission media include coaxial cables, copper wire, and fiber optics, including the wires that comprise the bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In an aspect of the subject technology, a machine-readable medium is a computer-readable medium encoded or stored with instructions and is a computing element, which defines structural and functional relationships between the instructions and the rest of the system, which permit the instructions' functionality to be realized. Instructions may be executable, for example, by a system or by a processor of the system. Instructions can be, for example, a computer program including code. A machine-readable medium may comprise one or more media.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the subject technology have been described, these have been presented by way of example only, and are not intended to limit the scope of the subject technology. Indeed, the novel methods and systems described herein may be embodied in a variety of other forms without departing from the spirit thereof. The accompanying claims and their equivalents are intended to cover such forms or modifications as would fall within the scope and spirit of the subject technology.

Described herein are at least the following concepts:

Concept 1. A compounding system comprising:

a transfer module having one or more transfer cartridges, each transfer cartridge having an access device coupled to a first pump;

a medication module having a medication container, wherein the access device is configured to access the medication container and draws medication from the medication container;

a diluent module having one or more diluent containers having a diluent therein, the diluent module comprising a second pump;

a filling module that receives medication from the first pump and diluent from the second pump to create a compounded medication comprising at least one medication and diluent, the filling module having a port configured (i) to be coupled to a compounded medication container and (ii) to direct the compounded medication to the compounded medication container through the port.

Concept 2. The compounding system of concept 1, wherein the one or more transfer cartridges are removable.

Concept 3. The compounding system of concept 1, wherein the access device is a needle Concept 4. The compounding system of concept 1, wherein the access device is a needless connector.

Concept 5. The compounding system of concept 1, wherein at least one of the transfer module or medication module is configured to move relative to the other of the transfer module and medication module.

Concept 6. The compounding system of claim 5, wherein at least one of the transfer module or medication module is configured to rotate.

Concept 7. The compounding system of concept 1, wherein the transfer module access device accesses the medication container and the compounded medication container.

Concept 8. The compounding system of concept 1, wherein the filling module comprises at least one sensor to measure a weight of the compounded medication container.

Concept 9. The compounding system of concept 1, wherein a new transfer cartridge is employed for a subsequent compounded medication procedure.

Concept 10. The compounding system of concept 1, wherein at least one sensor at least one of the medication, the diluent, or the compounded medication.

Concept 11. The compounding system of concept 10, wherein the sensor measures weight.

Concept 12. The compounding system of concept 10, wherein the sensor measures volume.

Concept 13. A compounding system comprising:

a transfer module having a transfer cartridge, the transfer cartridge having a plurality of access devices;

a medication module having a plurality of medication containers, wherein each access device is configured to access at least one medication container and to draw medication from the at least one medication container;

a diluent module having one or more diluent containers, each comprising a diluent;

a filling module that combines the at least one medication, received from at least one access device, and diluent, from the diluent module, to form a compounded medication, the filling module having a port that communicates the compounded medication to a compounded medication container.

Concept 14. The compounding system of concept 13, wherein the medication is received at the filling module from a first pump.

Concept 15. The compounding system of concept 13, wherein the diluent is received at the filling module from a second pump.

Concept 16. A compounding system for forming a plurality of compounded medications, the system comprising:

a transfer cartridge comprising a plurality of access devices, each access device configured to be used for a single compounded medication;

a medication cartridge comprising a plurality of medication containers each having a portion configured to receive at least part of an access device to fluidly couple at least one medication container with the access device, such that medication is drawn from the at least one medication container through the access device, wherein at least one of the transfer cartridge or the medication cartridge is configured to rotate about at least one axis to align the access device with the at least one medication container; and a filling module fluidly coupled to the access device to receive medication, from the at least one medication container, to form the compounded medication, the filling module comprising an outlet port that directs the compounded medication to a compounded medication container.

Concept 17. The compounding system of concept 16, further comprising a diluent, wherein the diluent is fluidly coupled to the filling module.

Concept 18. A compounding system for forming a plurality of compounded medications, the system comprising:

an array of access devices, each access device having a medication receiving portion;

an array of medication containers, each having a fluid port configured to receive the medication receiving portion of an access device to fluidly couple the medication container with the access device, such that medication is drawn from the medication container through the medication receiving portion, wherein at least one of the array of access devices or the array of medication containers is configured to move to align the medication receiving portion with at least one medication container; and an outlet port, configured to fluidly couple with the access device to receive medication, from at least one medication container, and to communicate the medication to a compounded medication container.

Concept 19. The compounding system of concept 18, wherein the medication receiving portion comprises a needle.

Concept 20. The compounding system of concept 18, wherein fluid port comprises an opening in the medication container.

Concept 21. The compounding system of concept 20, wherein the opening comprises a resilient member Concept 22. The compounding system of concept 18, wherein at least one of the array of access devices or the array of medication containers is configured to rotate.

Concept 23. The compounding system of concept 22, wherein at least one of the array of access devices or the array of medication containers rotate about a common axis.

Concept 24. A compounding system comprising:

a transfer module having one or more transfer cartridges, each transfer cartridge having an access device coupled to a first pump;

a medication module having one or more medications, wherein the access device is configured to access the medication;

a diluent module having one or more diluents, the diluent module comprising a second pump;

a filling module having a port configured to be coupled to a container; and wherein (i) the first pump transfers the medication to the filling module, and (ii) the second pump directs the diluent to the filling module to create a compounded medication, the filling module configured to communicate the compounded medication to the port.

Concept 25. The compounding system of concept 24, wherein at least one of the transfer module or the medication module move to align a medication with a transfer cartridge.

Concept 26. A method of compounding medications comprising:

receiving at least one medication container;

fluidly coupling a transfer cartridge with a medication container;

withdrawing a medication from the medication container;

receiving a medication at a port; and communicating a medication from the port to a compounded medication container.

Concept 27. The method of concept 26, further comprising receiving at least one order for a compounded medication.

Concept 28. The method of concept 26, further comprising receiving at least one diluent container.

Concept 29. The method of concept 26, further comprising fluidly coupling a second transfer cartridge with a second compounded medication container.

Concept 30. The method of concept 26, further comprising priming the compounded medication container Concept 31. The method of concept 26, further comprising withdrawing a diluent from at least one diluent container Concept 32. The method of concept 26, further comprising directing a diluent to the compounded medication container Concept 33. The method of concept 26, further comprising weighing at least one of the medication container, diluent container, or compounded medication container Concept 34. A non-transitory machine-readable medium containing machine-readable instructions for causing a processor to execute a method for compounding medications, the method comprising:

receiving at least one medication container;

fluidly coupling a transfer cartridge with a medication container;

withdrawing a medication from the medication container;

receiving a medication at a port; and communicating a medication from the port to a compounded medication container.

Concept 35. The method of concept 34, further comprising receiving at least one compounding order.

Concept 36. The method of concept 34, further comprising receiving at least one diluent container.

Concept 37. The method of concept 34, further comprising fluidly coupling a second transfer cartridge with a second compounded medication container.

Concept 38. The method of concept 34, further comprising priming the compounded medication container.

Concept 39. The method of concept 34, further comprising directing a diluent to the medication container.

Concept 40. The method of concept 34, further comprising weighing at least one of the medication container, diluent container, or compounded medication container.

What is claimed is:

1. A medication compounding system comprising:

a medication module rotatable about a first axis of rotation and comprising a medication tray configured to hold one or more medication containers;

a rotatable transfer module comprising a chassis and rotatable about a second axis of rotation and configured to hold a circular array of transfer cartridges, and configured to rotate and align a respective transfer cartridge held by the rotatable transfer module with a selected medication container of the one or more medication containers held by the medication tray, the respective transfer cartridge comprising a respective access device configured to couple the respective transfer cartridge with the selected medication container, and configured to extend into a fluid port of the selected medication container, when the respective transfer cartridge is aligned with the selected medication container; and a rotatable filling module aligned circumferentially along the second axis of rotation with the transfer module, wherein the rotatable filling module comprises a circular portion and a plurality of filling ports disposed on the circular portion around the second axis of rotation.

2. The medication compounding system of claim 1, wherein the respective transfer cartridge is coupled with the selected medication container by lowering the medication tray with respect to a body portion of the medication compounding system so that the respective access device extends into a fluid port of the selected medication container.

3. The medication compounding system of claim 2, wherein the second axis of rotation is substantially parallel to and offset from the first axis of rotation on the same plane substantially perpendicular to the second axis of rotation.

4. The medication compounding system of claim 3, wherein the medication module, including the medication tray, is coupled to an elongated slot disposed within the body portion, the elongated slot configured to permit up and down movement of the medication module and the medication tray, towards or away from the transfer module.

5. The medication compounding system of claim 1, wherein the circular portion is parallel to the array of transfer cartridges such that a respective filling port of the plurality of filling ports is positioned to couple to the respective transfer cartridge.

6. The medication compounding system of claim 5, wherein the transfer module and the rotatable filling module are joined together as an assembly coupled to a lower hub of a body portion of the medication compounding system.

7. The medication compounding system of claim 5, further comprising:

a diluent module aligned circumferentially along the second axis of rotation with the transfer module, wherein the diluent module comprises a diluent port disposed proximate to the second axis of rotation on the same plane as the circular portion of the rotatable filling module.

8. A compounding device comprising:

a body;

a medication module rotatably coupled to the body and rotatable about a first axis of rotation and comprising a medication tray configured to hold one or more medication containers;

a rotatable transfer module comprising a chassis and rotatably coupled to the body and rotatable about a second axis of rotation and configured to hold a circular array of transfer cartridges, and configured to rotate and align a respective transfer cartridge held by the rotatable transfer module with a selected medication container of the one or more medication containers held by the medication tray, the respective transfer cartridge comprising a respective access device configured to couple the respective transfer cartridge with the selected medication container, and configured to extend into a fluid port of the selected medication container, when the respective transfer cartridge is aligned with the selected medication container; and a rotatable filling module aligned circumferentially along the second axis of rotation with the transfer module, wherein the rotatable filling module comprises a circular portion and a plurality of filling ports disposed on the circular portion around the second axis of rotation.

9. The compounding device of claim 8, wherein the circular portion is parallel to the array of transfer cartridges such that a respective filling port of the plurality of filling ports is positioned to couple to the respective transfer cartridge.

10. The compounding device of claim 9, wherein the transfer module and the rotatable filling module are joined together as an assembly coupled to a lower hub of the body.

11. The compounding device of claim 9, further comprising:

a diluent module aligned circumferentially along the second axis of rotation with the transfer module, wherein the diluent module comprises a diluent port disposed proximate to the second axis of rotation on the same plane as the circular portion of the rotatable filling module.

12. The compounding device of claim 9, wherein the respective transfer cartridge is coupled with the selected medication container by lowering the medication tray with respect to the body so that the respective access device extends into a fluid port of the selected medication container.

13. The compounding device of claim 12, wherein the second axis of rotation is substantially parallel to and offset from the first axis of rotation on the same plane as the circular portion of the rotatable filling module.

14. The compounding device of claim 13, wherein the medication module, including the medication tray, is coupled to an elongated slot disposed within the body, the elongated slot configured to permit up and down movement of the medication module and the medication tray, towards or away from the transfer module.

* * * * *